United States Patent
Kim et al.

(10) Patent No.: US 12,118,262 B2
(45) Date of Patent: Oct. 15, 2024

(54) ELECTRONIC DEVICE FOR SEAMLESSLY DISPLAYING IMAGES, AND OPERATING METHOD THEREFOR

(71) Applicant: Samsung Electronics Co., Ltd., Suwon-si (KR)

(72) Inventors: Seungjin Kim, Suwon-si (KR); Sungjun Lee, Suwon-si (KR); Jungbae Kim, Suwon-si (KR); Joonyung Park, Suwon-si (KR); Jiesoon Jeong, Suwon-si (KR); Mooyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 17/703,347

(22) Filed: Mar. 24, 2022

(65) Prior Publication Data

US 2022/0214850 A1    Jul. 7, 2022

Related U.S. Application Data

(63) Continuation of application No. PCT/KR2020/012785, filed on Sep. 22, 2020.

(30) Foreign Application Priority Data

Sep. 25, 2019    (KR) ........................ 10-2019-0117813

(51) Int. Cl.
 *G06T 3/40* (2024.01)
 *G06F 3/14* (2006.01)
 *G06T 3/60* (2024.01)

(52) U.S. Cl.
 CPC .............. *G06F 3/1423* (2013.01); *G06T 3/40* (2013.01); *G06T 3/60* (2013.01)

(58) Field of Classification Search
 CPC .. G06F 3/1423; G06F 3/1438; G09G 2360/04
 See application file for complete search history.

(56) References Cited

U.S. PATENT DOCUMENTS

| 8,631,417 B1 | 1/2014 | Mendes Da Costa et al. |
| 9,100,691 B2 | 8/2015 | Seo |

(Continued)

FOREIGN PATENT DOCUMENTS

| JP | 2012-532804 A | 12/2012 |
| KR | 10-2015-0094479 A | 8/2015 |

(Continued)

OTHER PUBLICATIONS

Extended European Search Report dated Oct. 17, 2022; European Appln. No. 20869094.1-1207 / 4024195 PCT/KR2020012785.

*Primary Examiner* — Diane M Wills
(74) *Attorney, Agent, or Firm* — Jefferson IP Law, LLP

(57) ABSTRACT

An electronic device is provided. The electronic device includes a first display disposed on a first surface of the electronic device, a second display disposed on a second surface of the electronic device and having at least a portion thereof being unviewable to a user according to a folding state of the electronic device, a memory configured to store instructions, and a processor electrically connected to the first display, the second display, and the memory. The processor is configured to execute the instructions to detect a change in the folding state of the electronic device while displaying a first image on one of the first display or the second display, when the change in the folding state is detected, generate a second image to be displayed on the other of the first display or the second display, while generating the second image, store a snapshot image of the first image in the memory and display the snapshot image on the other of the first display or the second display, and when (Continued)

the second image is generated, display the second image on the other of the first display or the second display instead of the snapshot image.

16 Claims, 11 Drawing Sheets

(56) References Cited

U.S. PATENT DOCUMENTS

| | | | |
|---|---|---|---|
| 10,255,021 B2 | 4/2019 | Makar et al. | |
| 2010/0302278 A1 | 12/2010 | Shaffer et al. | |
| 2013/0014156 A1* | 1/2013 | Seo | H04N 21/44016 725/32 |
| 2013/0169605 A1 | 7/2013 | Moyse | |
| 2014/0285476 A1* | 9/2014 | Cho | H04M 1/0268 345/204 |
| 2015/0198978 A1* | 7/2015 | Catchpole | G06F 3/041 345/173 |
| 2015/0227224 A1 | 8/2015 | Park et al. | |
| 2015/0227225 A1* | 8/2015 | Park | G06F 1/1652 345/173 |
| 2015/0309611 A1 | 10/2015 | Vertegaal et al. | |
| 2015/0338888 A1* | 11/2015 | Kim | G06F 1/1643 345/156 |
| 2016/0050408 A1 | 2/2016 | Lee et al. | |
| 2017/0034468 A1 | 2/2017 | Won et al. | |
| 2019/0042066 A1 | 2/2019 | Kim et al. | |
| 2021/0089202 A1 | 3/2021 | Sim et al. | |
| 2022/0122514 A1* | 4/2022 | Kwon | G06F 1/3218 |

FOREIGN PATENT DOCUMENTS

| | | | |
|---|---|---|---|
| KR | 10-2015-0094481 A | 8/2015 | |
| KR | 10-2016-0021497 A | 2/2016 | |
| KR | 10-2017-0015622 A | 2/2017 | |
| KR | 10-1893052 B1 | 10/2018 | |
| KR | 10-1978168 B1 | 5/2019 | |
| KR | 10-2019-0092006 A | 8/2019 | |
| KR | 10-2081932 B1 | 4/2020 | |
| WO | WO-2016191136 A1 * | 12/2016 | G06F 3/1454 |

* cited by examiner

ELECTRONIC DEVICE FOR SEAMLESSLY DISPLAYING IMAGES, AND OPERATING METHOD THEREFOR

CROSS-REFERENCE TO RELATED APPLICATION(S)

This application is a continuation application, claiming priority under § 365(c), of an International application No. PCT/KR2020/012785, filed on Sep. 22, 2020, which is based on and claims the benefit of a Korean patent application number 10-2019-0117813, filed on Sep. 25, 2019, in the Korean Intellectual Property Office, the disclosure of which is incorporated by reference herein in its entirety.

BACKGROUND

1. Field

The disclosure relates to an electronic device which seamlessly displays images, and an operating method therefor.

2 Description of Related Art

With the development of digital technology, electronic devices are provided in various forms like smartphones, tablet personal computers (PCs), or personal digital assistants (PDAs). Electronic devices are developing in portable or wearable forms so as to enhance portability and accessibility of users.

Recently, portable electronic devices such as smartphones, tablet PCs, or the like are becoming lighter and thinner for the easiness to carry, and are developing for many fields for the sake of user convenience. In particular, an electronic device of a foldable type provided with a flexible display provides a relatively larger screen than an electronic device of a normal bar type, and has its size reduced when the electronic device is folded, and is easy to carry, and accordingly, such electronic devices are being popularized as electronic devices for satisfying consumers' tastes.

The above information is presented as background information only to assist with an understanding of the disclosure. No determination has been made, and no assertion is made, as to whether any of the above might be applicable as prior art with regard to the disclosure.

SUMMARY

A foldable electronic device may include a hinge structure and may go into a folded state or an unfolded state according to a user's operation. The foldable electronic device may have a different resolution of a display according to whether it is in the folded state or the unfolded state. Accordingly, the foldable electronic device may require an image of a different resolution when a state changes between the folded state and the unfolded state. However, time required to draw a new image may be longer than time required to change the state between the folded state and the unfolded state. Therefore, a user may experience a delay in which no image is displayed on a display of the foldable electronic device when the state changes between the folded state and the unfolded state.

Aspects of the disclosure are to address at least the above-mentioned problems and/or disadvantages and to provide at least the advantages described below. Accordingly, an aspect of the disclosure is to provide an electronic device which seamlessly displays images, and an operating method therefor.

Additional aspects will be set forth in part in the description which follows and, in part, will be apparent from the description, or may be learned by practice of the presented embodiments.

In accordance with an aspect of the disclosure, an electronic device is provided. The electronic device includes a first display disposed on a first surface of the electronic device, a second display disposed on a second surface of the electronic device and having a least a portion thereof being unviewable to a user according to a folding state of the electronic device, a memory configured to store instructions, and a processor electrically connected with the first display, the second display, and the memory. the processor may be configured to execute the instructions to detect a change in the folding state of the electronic device while displaying a first image on one of the first display or the second display. For example, an operation may be performed when an unfolding or closing operation by a predetermined level (or angle) or more occurs. When unfolding by less than the predetermined level occurs, the operation may not be performed. For example, when a folding operation repeats at high speed, a snapshot image generated by an initial folding state change may be maintained as it is. The processor may generate a second image to display on the other of the first display or the second display, may store a snapshot image of the first image in the memory and display the snapshot image on the other of the first display or the second display while generating the second image, and when the second image is generated, may display the second image on the other of the first display or the second display instead of the snapshot image.

In accordance with another aspect of the disclosure, an electronic device is provided. The electronic device includes a display in which an area facing a user is changed according to a folding state of the electronic device, a memory to store instructions, and a processor electrically connected with the display and the memory, and the processor may execute the instructions to detect a change of the folding state of the electronic device while displaying a first image on a first area of the display, when the change of the folding state is detected, identify a second area of the display corresponding to the changed folding state, generate a second image to display on the identified second area, while generating the second image, store a snapshot image regarding the first image in the memory and display the snapshot image on the identified second area of the display, and when the second image is generated, display the second image on the identified second area of the display instead of the snapshot image.

According to various embodiments, the electronic device and the operating method thereof may take a snapshot of an existing image when a state changes between a folded state and an unfolded state, and may display the snapshot image on a new display area of the display, so that user's experience of a delay is reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
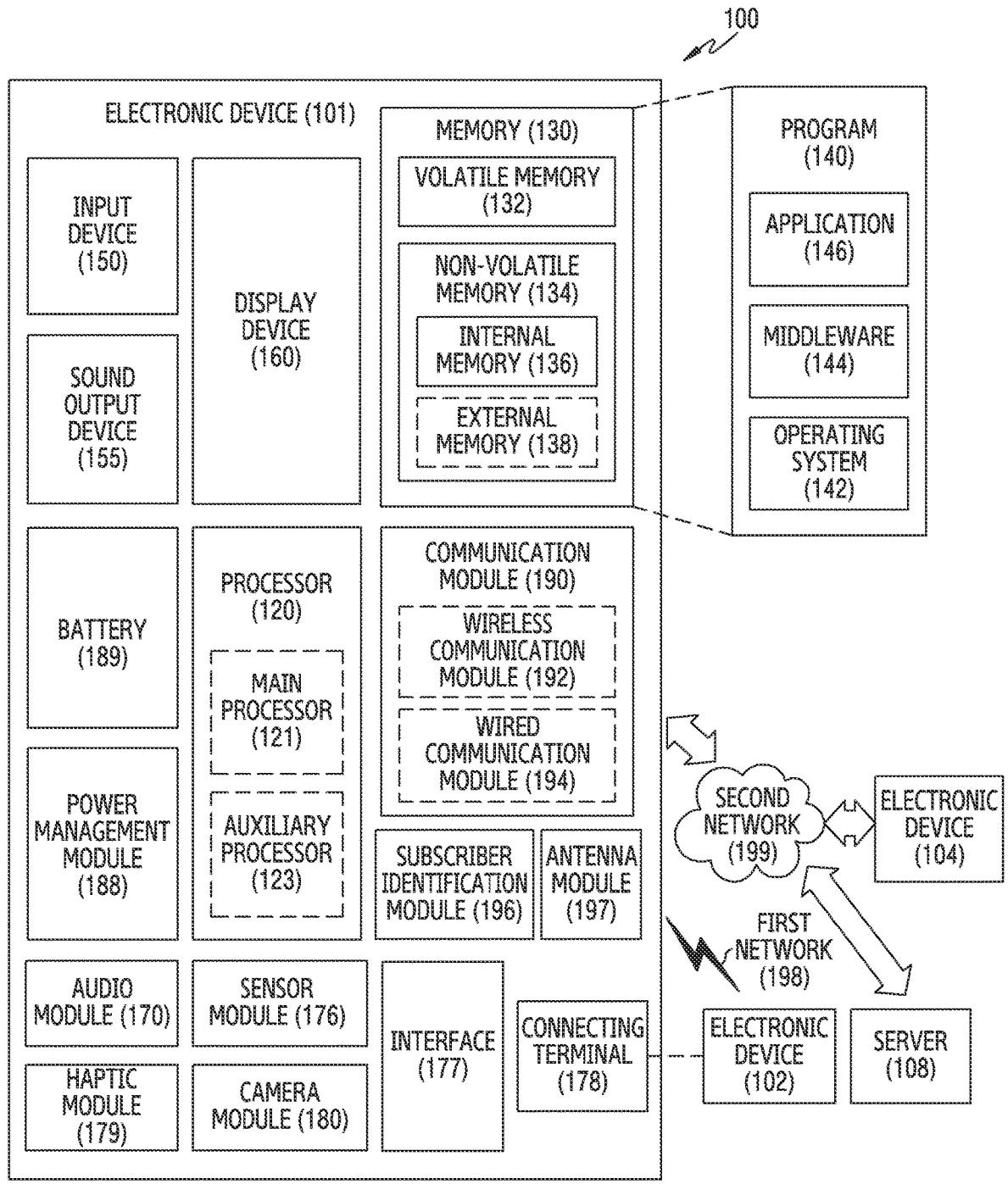
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
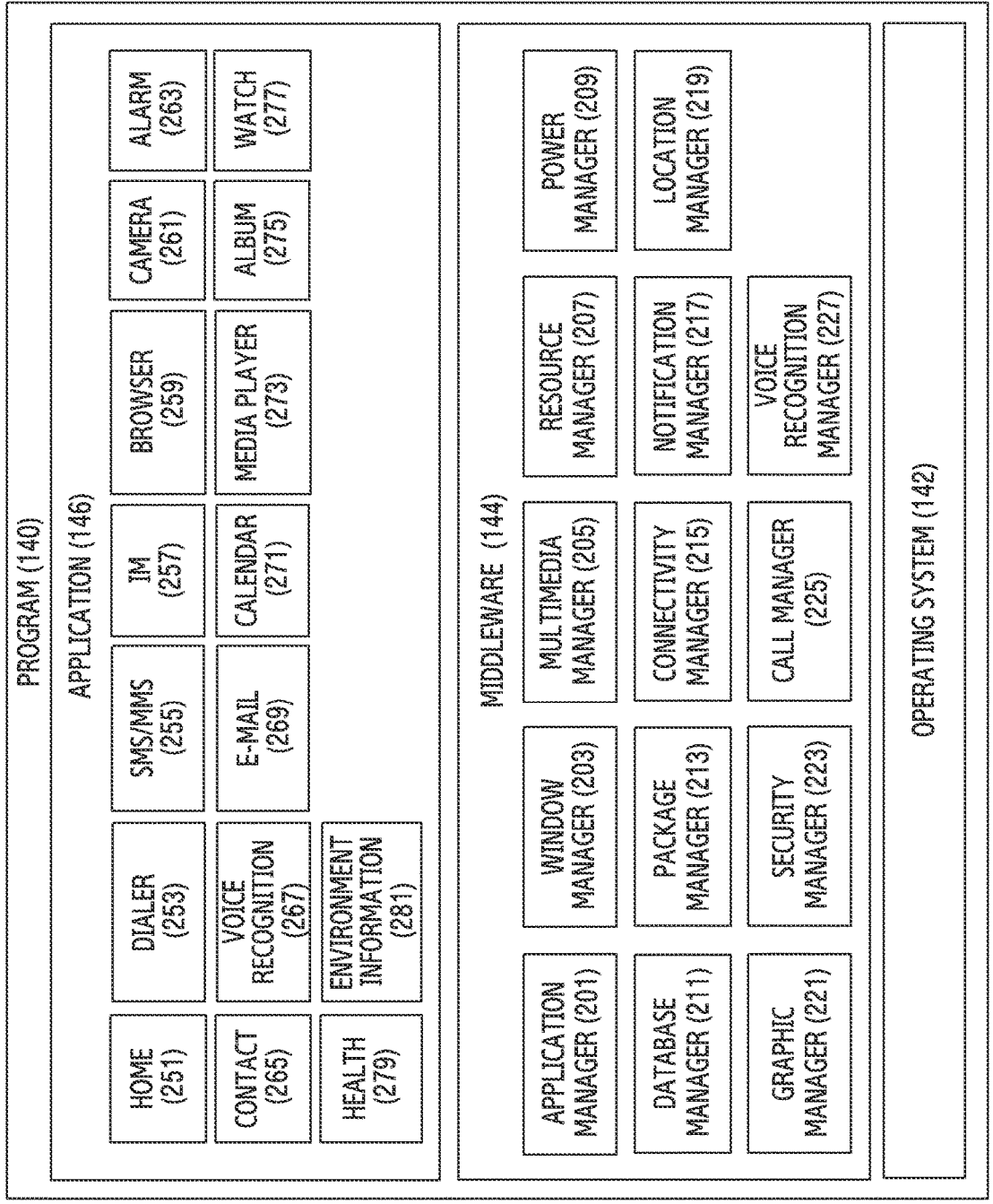
FIG. 2 is a block diagram illustrating a program of an electronic device according to an embodiment of the disclosure.

FIG. 2 is a block diagram 200 illustrating the program 140 according to an embodiment of the disclosure.

Referring to FIG. 2, according to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be preloaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
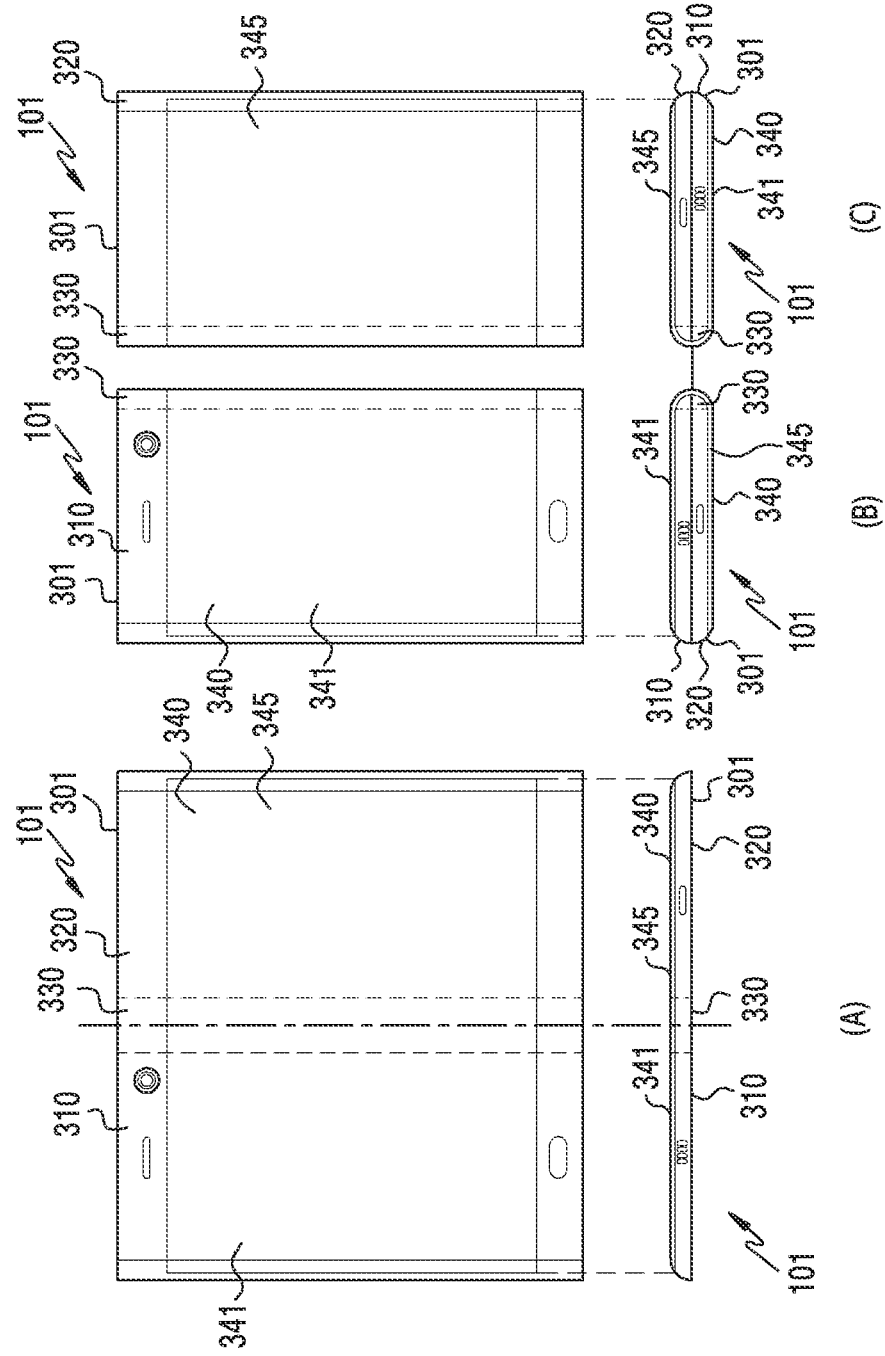
FIG. 3 is a view illustrating an example of an electronic device of an out-folding method according to an embodiment of the disclosure.

FIG. 3 illustrates an example of an electronic device 101 of an out-folding method according to an embodiment of the disclosure. Part (A) of FIG. 3 illustrates an unfolded state of the electronic device 101. Parts (B) and (C) of FIG. 3 illustrate a folded state of the electronic device 101.

Referring to parts (A) to (C) of FIG. 3, the electronic device 101 may include a foldable housing 301 and a flexible display 340. In an embodiment, a front surface of the electronic device 101 when the electronic device 101 is in the unfolded state may be a surface on which the flexible display 340 is disposed. In an embodiment, a rear surface of the electronic device 101 when the electronic device 101 is in the unfolded state may be the opposite surface of the surface on which the flexible display 340 is disposed. In an embodiment, a front surface of the electronic device 101 when the electronic device 101 is in the folded state may be a surface on which a first area 341 of the flexible display 340 is disposed. In an embodiment, a rear surface of the electronic device 101 when the electronic device 101 is in the folded state may be a surface on which a second area 345 of the flexible display 340 is disposed.

Referring to parts (A) to (C) of FIG. 3, the foldable housing 301 may include a first housing portion 310, a second housing portion 320, and a folding portion 330. In an embodiment, the first housing portion 310 and the second housing portion 320 may have a substantially symmetrical shape with reference to a folding axis 335 of the folding portion 330. In an embodiment, the folding portion 330 may connect the first housing portion 310 and the second housing portion 320 to be rotatable with respect to each other. In an embodiment, the folding portion 330 may provide a pivot movement of the first housing portion 310 and the second housing portion 320.

Referring to part (A) of FIG. 3, when the folding portion 330 is unfolded, the first housing portion 310 and the second housing portion 320 may be parallel to each other. In an embodiment, when the first housing portion 310 and the second housing portion 320 are parallel to each other, the electronic device 101 may be in the unfolded state.

Referring to part (A) of FIG. 3, when the folding portion 330 is unfolded, all areas 341, 345 of the flexible display 340 may face a user.

Referring to parts (B) and (C) of FIG. 3, when the folding portion 330 is folded, a rear surface of the first housing portion 310 and a rear surface of the second housing portion 320 may face each other. In an embodiment, when the first housing portion 310 and the second housing portion 320 face each other, the electronic device 101 may be in the folded state.

Referring to part (B) of FIG. 3, when the folding portion 330 is folded, the first area 341 of all areas 341, 345 of the flexible display 340 may face the user, and the second area 345 may not face the user. Referring to part (C) of FIG. 3, when the folding portion 330 is folded, the second area 345 of all areas 341, 345 of the flexible display 340 may face the user, and the first area 341 may not face the user.

In an embodiment, when the folding portion 330 is unfolded in part and is folded in part, the first housing portion 310 and the second housing portion 320 may have a predetermined angle with reference to the folding axis 335. In an embodiment, when the first housing portion 310 and the second housing portion 320 have a predetermined angle with reference to the folding axis 335, the electronic device 101 may be in an intermediate state.

Figure 4:
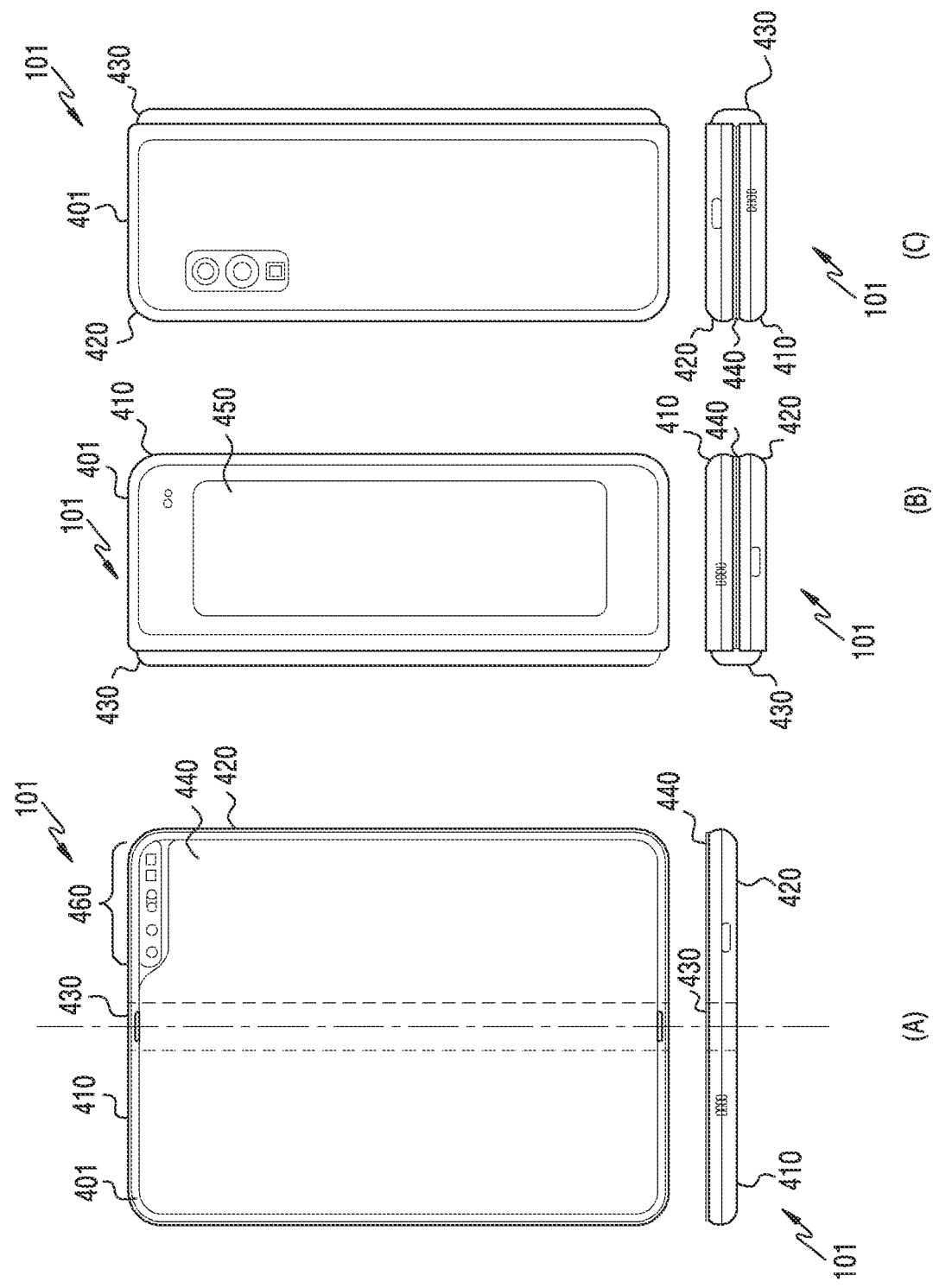
FIG. 4 is a view illustrating an example of an electronic device of an in-folding method according to an embodiment of the disclosure.

FIG. 4 illustrates an example of an electronic device 101 of an in-folding method according to an embodiment of the disclosure. Part (A) of FIG. 4 illustrates an unfolded state of the electronic device 101. Parts (B) and (C) of FIG. 4 illustrate a folded state of the electronic device 101.

Referring to parts (A) to (C) of FIG. 4, the electronic device 101 may include a foldable housing 401, a first display 440, and a second display 450. In an embodiment, a front surface of the electronic device 101 when the electronic device 101 is in the unfolded state may be a surface on which the first display 440 is disposed. In an embodiment, a rear surface of the electronic device 101 when the electronic device 101 is in the unfolded state may be the opposite surface of the surface on which the first display 440 is disposed. In an embodiment, a front surface of the electronic device 101 when the electronic device 101 is in the folded state may be a surface on which the second display 450 is disposed. In an embodiment, a rear surface of the electronic device 101 when the electronic device 101 is in the folded state may be the opposite surface of the surface on which the second display 450 is disposed. In an embodiment, the front surface and the rear surface of the electronic device 101 when the electronic device 101 is in the folded state may correspond to the rear surface of the electronic device 101 when the electronic device 101 is in the unfolded state.

Referring to parts (A) to (C) of FIG. 4, the foldable housing 401 may include a first housing portion 410, a second housing portion 420, and a folding portion 430. In an embodiment, the first housing portion 410 and the second housing portion 420 may have a substantially symmetrical shape with reference to a folding axis 435 of the folding portion 430. In an embodiment, the second housing portion 420 may include a sensor region 460. In an embodiment, the folding portion 430 may connect the first housing portion 410 and the second housing portion 420 to be rotatable with respect to each other. In an embodiment, the folding portion 430 may provide a pivot movement of the first housing portion 410 and the second housing portion 420.

Referring to part (A) of FIG. 4, when the folding portion 430 is unfolded, the first housing portion 410 and the second housing portion 420 may be parallel to each other. In an embodiment, when the first housing portion 410 and the second housing portion 420 are parallel to each other, the electronic device 101 may be in the unfolded state.

Referring to part (A) of FIG. 4, when the folding portion 430 is unfolded, the first display 440 or the second display 450 may be visible to a user. In an embodiment, when the user views the front surface of the electronic device 101 in the unfolded state, the first display 440 may be visible to the user. In an embodiment, when the user views the front surface of the electronic device 101 in the unfolded state, the sensor region 460 may be visible to the user. In an embodiment, when the user views the rear surface of the electronic device 101 in the unfolded state, the second display 450 may be visible to the user.

Referring to parts (B) and (C) of FIG. 4, when the folding portion 430 is folded, a front surface of the first housing portion 410 and a front surface of the second housing portion 420 may face each other. In an embodiment, when the first housing portion 410 and the second housing portion 420 face each other, the electronic device 101 may be in the folded state.

Referring to parts (B) and (C) of FIG. 4, when the folding portion 430 is folded, the first display 440 may be folded.

Referring to parts (B) and (C) of FIG. 4, when the folding portion 430 is folded, at least part of the first display 440 may be unviewable to the user. In an embodiment, referring to parts (B) and (C) of FIG. 4, when the folding portion 430 is folded, the second display 450 may be visible to the user. In an embodiment, when the user views the front surface of the electronic device 101 in the folded state, the second display 450 may be visible to the user.

In an embodiment, when the folding portion 430 is unfolded in part and is folded in part, the first housing portion 410 and the second housing portion 420 may have a predetermined angle with reference to the folding axis 435. In an embodiment, when the first housing portion 410 and the second housing portion 420 have a predetermined angle with reference to the folding axis 435, the electronic device 101 may be in an intermediate state.

Figure 5:
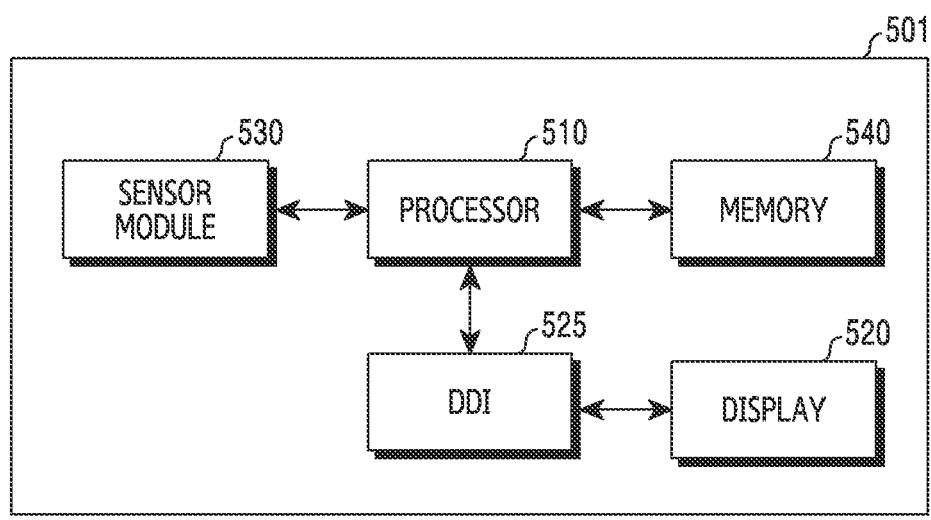
FIG. 5 is a block diagram of an electronic device according to an embodiment of the disclosure.

FIG. 5 is a block diagram of an electronic device 501 according to an embodiment of the disclosure. In an embodiment, the electronic device 501 of FIG. 5 may correspond to the electronic device 101 of FIG. 1.

Referring to FIG. 5, the electronic device 501 may include a processor 510, a display 520, a sensor module 530, a memory 540, or a combination of these. In an embodiment, the processor 510, the display 520, a display driver integrated circuit (DDI) 525, the sensor module 530, or the memory 540 of FIG. 5 may correspond to the processor 120, the display device 160, the sensor module 176, or the memory 130 of FIG. 1, respectively. In FIG. 5, it is illustrated that the electronic device 501 includes one display 520, but this is merely an example. In an embodiment, the electronic device 501 may include two or more displays.

In an embodiment, the processor 510 may generate an image to display on the display 520, by using a program stored in the memory 540 (for example, the program 140 of FIG. 1). In an embodiment, the processor 510 may generate the image by using an application installed in the electronic device 101. In an embodiment, the processor 510 may generate the image at pre-designated intervals. In an embodiment, the image generated at the pre-designated intervals may be referred to as an image stream.

In an embodiment, the processor 510 may draw an image on a layer allocated to the application installed in the electronic device 101. In an embodiment, drawing may be an operation of writing an image (or graphic data) on the memory 540 (for example, a buffer) allocated to the layer of the application. In an embodiment, the layer may be information for managing a screen area (for example, a layer area or a surface area) corresponding to the application. In an embodiment, the layer may be an object or an instance corresponding to a specified data structure, and may be generated and deleted according to an application request. In an embodiment, the layer may include an address of a graphic buffer for the application to draw an image (or graphic data), information of a frame area (a position occupied by the layer in the entire area of the frame buffer). In an embodiment, the layer may be referred to as a surface or a window.

In an embodiment, the processor 510 may generate an image to display on the display 520 by synthesizing a layer on a certain application, a layer on a status bar, a launcher layer, a wallpaper layer, a layer on a notification, or a combination of these.

In an embodiment, the processor 510 may transmit the generated image to the DDI 525. In an embodiment, the DDI 525 may transmit the image to the display 520 through an interface which operatively connects or couples the DDI 525 and the display 520. In an embodiment, the DDI 525 may package the received image according to a protocol of each interface, and may transmit the packaged image to the display 520. In an embodiment, the interface may include a mobile industry processor interface (MIPI), a high definition multimedia interface (HDMI), a display port (DP), or a combination of these.

In an embodiment, the processor 510 may display the image on a display area of the display 520 corresponding to a state (for example, a folded state or an unfolded state) of the electronic device 501. In an embodiment, the display area of the display 520 may indicate an activated area in the entire area of the display 520. For example, the entire area of the display 520 may correspond to the area of the flexible display 340 of FIG. 3. For example, the entire area of the display 520 may correspond to the area of the first display 440 of FIG. 4 and the area of the second display 450.

In an embodiment, when the electronic device 501 uses an out-folding method and is in an unfolded state, the display area of the display 520 may correspond to the entire area (for example, the area of the flexible display 340 of FIG. 3) of the display 520. In an embodiment, when the electronic device 501 uses the out-folding method and is in a folded state, the display area of the display 520 may correspond to a certain area of the display 520 (for example, the first area 341 or the second area 345 of the flexible display 340 of FIG. 3).

In an embodiment, when the electronic device 501 uses an in-folding method and is in an unfolded state, the display area of the display 520 may correspond to an area of a first display (for example, the first display 440 of FIG. 4) of the display 520. In an embodiment, when the electronic device 501 uses the in-folding method and is in a folded state, the display area of the display 520 may correspond to an area of a second display (for example, the second display 450 of FIG. 4) of the display 520.

In an embodiment, the processor 510 may generate an image indicating a result of executing an ongoing application (for example, the application 146 of FIG. 1), and may display the generated image on the display 520. In an embodiment, the processor 510 may generate an image of a first resolution corresponding to a first display area of the display 520 corresponding to a state of the electronic device 501, and may display the image of the first resolution on the first display area of the display 520. In an embodiment, the first display area may be a pre-designated display area when the electronic device is in a first state (for example, a folded state). In an embodiment, the first resolution may correspond to a resolution of the first display area. In an embodiment, displaying the image indicating the result of executing the application on the display 520 may indicate displaying the application on the display 520.

In an embodiment, the processor 510 may identify a state change of the electronic device 501 in the middle of displaying the image of the first resolution on the first display area of the display 520. In an embodiment, the processor 510 may identify the state change of the electronic device 501, based on the sensor module 530. In an embodiment, the processor 510 may identify a first state change from the folded state of the electronic device 501 to the unfolded state, based on the sensor module 530. In an embodiment, the processor 510 may determine a state change from the unfolded state of the electronic device 501 to the folded state by utilizing two or more sensors, based on the sensor module 530. For example, after a touch operation (a grip for folding or unfolding) occurs through a touch sensor, the processor 510 may determine a completely folded or unfolded state by identifying progress toward folding or unfolding through an angular velocity sensor.

In an embodiment, when the state change of the electronic device 501 is identified, the processor 510 may activate (for example, turn-on) a new display area of the display 520 corresponding to the changed state of the electronic device 501. In an embodiment, when the state change of the electronic device 501 is identified, the processor 510 may inactivate the first display area of the display 520. In an embodiment, the new display area corresponding to the changed state of the electronic device 501 may be a second display area.

In an embodiment, when the state change of the electronic device 501 is identified, the processor 510 may identify continuity information of the application (for example, the application 146 of FIG. 1) which is being displayed on the first display area of the display 520. In an embodiment, the continuity information may be information indicating whether the application already displayed will be displayed when the state of the electronic device 501 is changed. In an embodiment, the continuity information may be information indicating whether the application already displayed will be displayed when the first state change of the electronic device 501 occurs, and indicating whether the application already displayed will be displayed when a second state change of the electronic device 501 occurs. In an embodiment, for a certain application, continuity at the time of the first state change, and continuity at the time of the second state change may be set to be the same as each other or different from each other. For example, for a certain application, continuity at the time of the first state change, and continuity at the time of the second state change may be set. For example, for a certain application, continuity at the time of the first state change, and continuity at the time of the second state change may be disabled. For example, for a certain application, continuity at the time of the first state change may be set, whereas continuity at the time of the second state change may be disabled.

In an embodiment, when continuity at the time of a certain state change (for example, the first state change) is set for a certain application which is being displayed in the folded state of the electronic device 501, and when the electronic device 501 changes from a first state (for example, the folded state) to a second state (for example, the unfolded state), the certain application may be displayed even in the second state (for example, the unfolded state).

In an embodiment, when the continuity at the time of the certain state change (for example, the first state change) is disabled for the certain application which is being displayed in the folded state of the electronic device 501, and when the electronic device 501 changes from the first state (for example, the folded state) to the second state (for example, the unfolded state), displaying of the certain application may be stopped. In an embodiment, when the continuity at the time of certain state change (for example, the first state change) is disabled for all applications which are being displayed in the folded state of the electronic device 501, and when the electronic device 501 changes from the first state (for example, the folded state) to the second state (for example, the unfolded state), the display 520 may be inactivated (for example, turned off). In an embodiment, when the continuity at the time of the certain state change (for example, the first state change) is disabled for all applications which are being displayed in the folded state of the electronic device 501, and when the electronic device 501 changes from the first state (for example, the folded state) to the second state (for example, the unfolded state), the display 520 may display a pre-designated screen (for example, a home screen, a lock screen).

In an embodiment, when continuity of the application which is being displayed on the first display area of the display 520 is set, the processor 510 may newly generate an image indicating a result of executing the running application (for example, the application 146 of FIG. 1). In an embodiment, the new image indicating the result of executing the running application (for example, the application 146 of FIG. 1) may correspond to a resolution of the second display area of the display 520. In an embodiment, the processor 510 may newly generate the image by newly drawing a layer on a certain application, a layer on a status bar, a launcher layer, a wallpaper layer, a layer on a notification, or a combination of these.

In an embodiment, the processor 510 may display the new image indicating the result of executing the running application (for example, the application 146 of FIG. 1) on the second display area of the display 520.

In an embodiment, when the state change of the electronic device 501 is identified, the processor 510 may take a snapshot of the existing image displayed on the first display area and may store the same in the memory 540. In an embodiment, when the state change of the electronic device 501 is identified, the processor 510 may display a snapshot image of the existing image displayed on the first display area on the second display area of the display 520. In an embodiment, the processor 510 may display the snapshot image on the second display area of the display 520 until a new image is generated.

In an embodiment, the processor 510 may perform image-processing (for example, scaling, rotation, blurring, or a combination of these) with respect to the snapshot image based on the resolution of the second display area, and then, may display the image-processed snapshot image on the second display area of the display 520.

In an embodiment, when a new image is generated, the processor 510 may display the new image on the second display area of the display 520 instead of the existing image. In an embodiment, the processor 510 may perform image-processing with respect to the new image, and may display the image-processed new image on the second display area of the display 520 for a pre-designated time. In an embodiment, the processor 510 may display the image-processed new image for the pre-designated time, and then, may display the new image to which image-processing is not applied on the second display area of the display 520.

It is illustrated that, only when the state of the electronic device 501 is changed, the snapshot image is displayed until a new image is generated. However, this is merely an example and the disclosure is not limited to the above-described example. In an embodiment, even when a display area of the display 520 is changed, the snapshot image regarding the existing image may be displayed until a new image is generated. In an embodiment, the change of the display area of the display 520 may include a change of an activated display (for example, a change between the first display 440 and the second display 450 of FIG. 4), a change of an activated area in the entire area of the display, a change of a resolution, or a change based on a combination of these. In an embodiment, the change of the activated area of the display may include a change of a size, a position of the activated area in the entire area of the display, or a combination of these.

Figure 6:
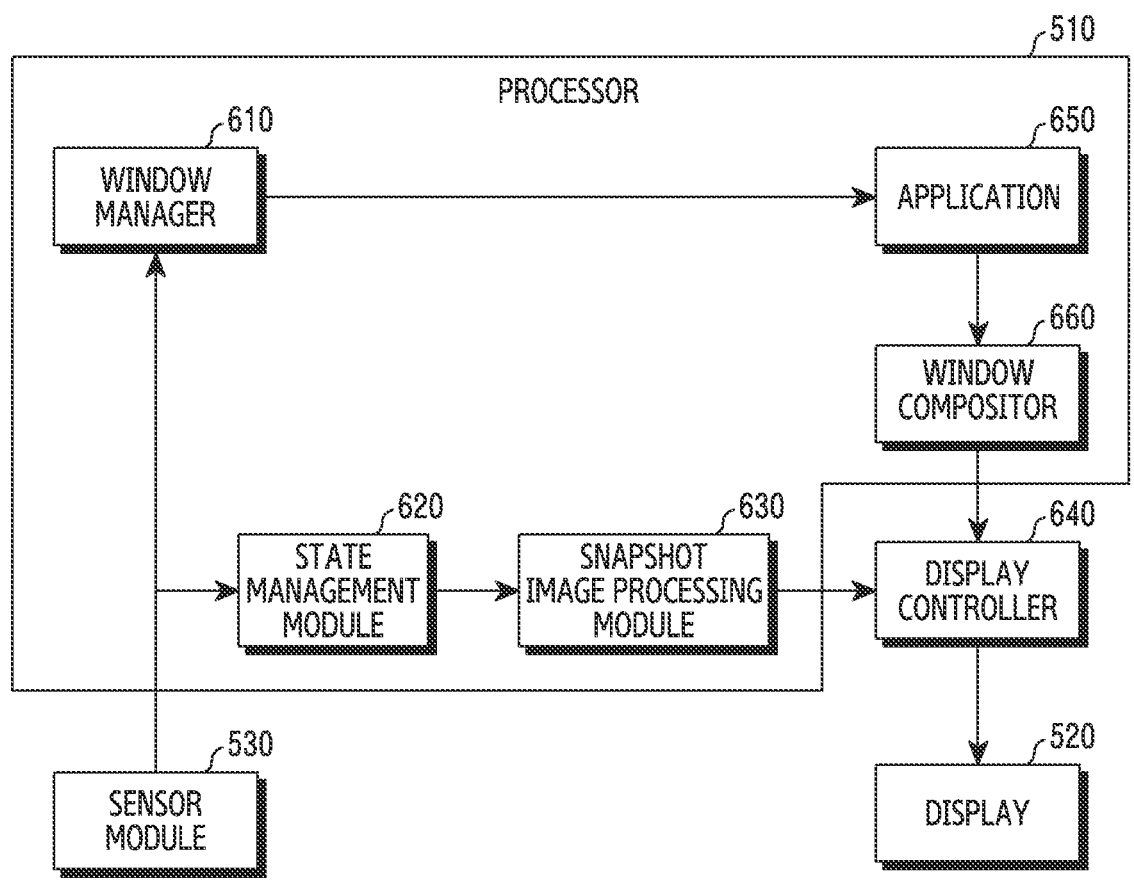
FIG. 6 is a block diagram illustrating a processor of an electronic device according to an embodiment of the disclosure.

FIG. 6 is a block diagram illustrating a program (for example, the program 140 of FIG. 1) of an electronic device (for example, the electronic device 101 of FIG. 1) according to an embodiment of the disclosure.

Referring to FIG. 6, the processor 510 may include a window manager 610, a state management module 620, a snapshot image processing module 630, an application 650, a window compositor 660, or a combination of these. In an embodiment, a display controller 640 may correspond to the DDI 525 of FIG. 5. In an embodiment, components of the processor 510 may be implemented in a hardware level or may be implement in a software level. In an embodiment, the sensor module 530, and the display 520 of FIG. 6 may correspond to the sensor module 530, and the display 520 of FIG. 5, respectively.

In an embodiment, when a state change of the electronic device 501 is identified through the sensor module 530, the window manager 610 may transmit information of a display area corresponding to the changed state of the electronic device 501 to the application 650. In an embodiment, when the state change of the electronic device 501 is identified, the window manager 610 may transmit the information of the display area corresponding to the changed state of the electronic device 501 to the application 650 in which continuity is set among running applications. In an embodiment, a display area of the display 520 according to a state before the state of the electronic device 501 is changed may be referred to as a first display area, and a display area of the display 520 according to a state after the state of the electronic device 501 is changed may be referred to as a second display area. In an embodiment, the information of the display area may include information regarding a resolution of the second display area.

In an embodiment, when the state change of the electronic device 501 is identified through the sensor module 530, the state management module 620 may activate the second display area of the display 520. In an embodiment, the state management module 620 may activate the second display area of the display 520 through the display controller 640. In an embodiment, when the state of the electronic device 501 changes from a folded state to an unfolded state, the state management module 620 may activate a display area of the display 520 corresponding to the unfolded state. In an embodiment, when the state of the electronic device 501 changes from the unfolded state to the folded state, the state management module 620 may activate a display area of the display 520 corresponding to the folded state. In an embodiment, in the case of an out-folding method, the display area of the display 520 corresponding to the folded state may be the first area 341 of the flexible display 340 of FIG. 3. In an embodiment, in the case of an in-folding method, the display area of the display 520 corresponding to the folded state may be the area of the second display 450 of FIG. 4. In an embodiment, in the case of the out-folding method, the display area of the display 520 corresponding to the unfolded state may be the entire area of the flexible display 340 of FIG. 3. In an embodiment, in the case of the in-folding method, the display area of the display 520 corresponding to the unfolded state may be the area of the first display 440 of FIG. 4.

In an embodiment, when the state change of the electronic device 501 is identified through the sensor module 530, the snapshot image processing module 630 may take a snapshot of the image displayed on the first display area of the display 520 and may store the snapshot image in a memory (for example, the memory 540 of FIG. 5). In an embodiment, the snapshot image processing module 630 may hook an image stored in the display controller 640 and may store the image in the memory (for example, the memory 540 of FIG. 5).

In an embodiment, the snapshot image processing module 630 may process (for example, scaling, rotation, blurring, or a combination thereof) the snapshot image based on the second display area of the display 520.

In an embodiment, the snapshot image processing module 630 may scale the snapshot image to correspond to a resolution of the second display area of the display 520. In an embodiment, when a resolution of the snapshot image is lower than the resolution of the second display area of the display 520, the snapshot image processing module 630 may up-scale the resolution of the snapshot image. In an embodiment, when the resolution of the snapshot image is higher than the resolution of the second display area of the display 520, the snapshot image processing module 630 may down-scale the resolution of the snapshot image.

In an embodiment, the snapshot image processing module 630 may rotate the snapshot image to correspond to an aspect ratio of the second display area of the display 520. In an embodiment, the snapshot image processing module 630 may rotate the snapshot image to make a major axis and a minor axis of the snapshot image correspond to a major axis and a minor axis of the second display area of the display 520. In an embodiment, the snapshot image processing module 630 may rotate the snapshot image to correspond to a rotation direction and/or a degree of rotation of the display 520 according to the state change of the electronic device 501.

In an embodiment, the snapshot image processing module 630 may blur (or smoothing) the scaled and/or rotated snapshot image.

In an embodiment, the display controller 640 may display the snapshot image processed based on the second display area of the display 520 on the second display area of the display 520. In an embodiment, the display controller 640 may display the snapshot image on the second display area of the display 520 until a new image is generated.

In an embodiment, the application 650 may draw at least one layer based on the resolution of the second display area of the display 520. In an embodiment, the application 650 may draw at least one layer based on the resolution of the second display area of the display 520 by using a drawing library (for example, a view).

In an embodiment, the window compositor 660 may generate a new image by combining layers of the application 650.

In an embodiment, the display controller 640 may display the new image from the window compositor 660 on the second display area of the display 520. In an embodiment, the display controller 640 may display an image where a pre-designated image effect (for example, blurring) is applied to the new image on the second display area of the display 520, and then, may display the new image to which the pre-designated image effect is not applied on the second display area of the display 520.

Figure 7:
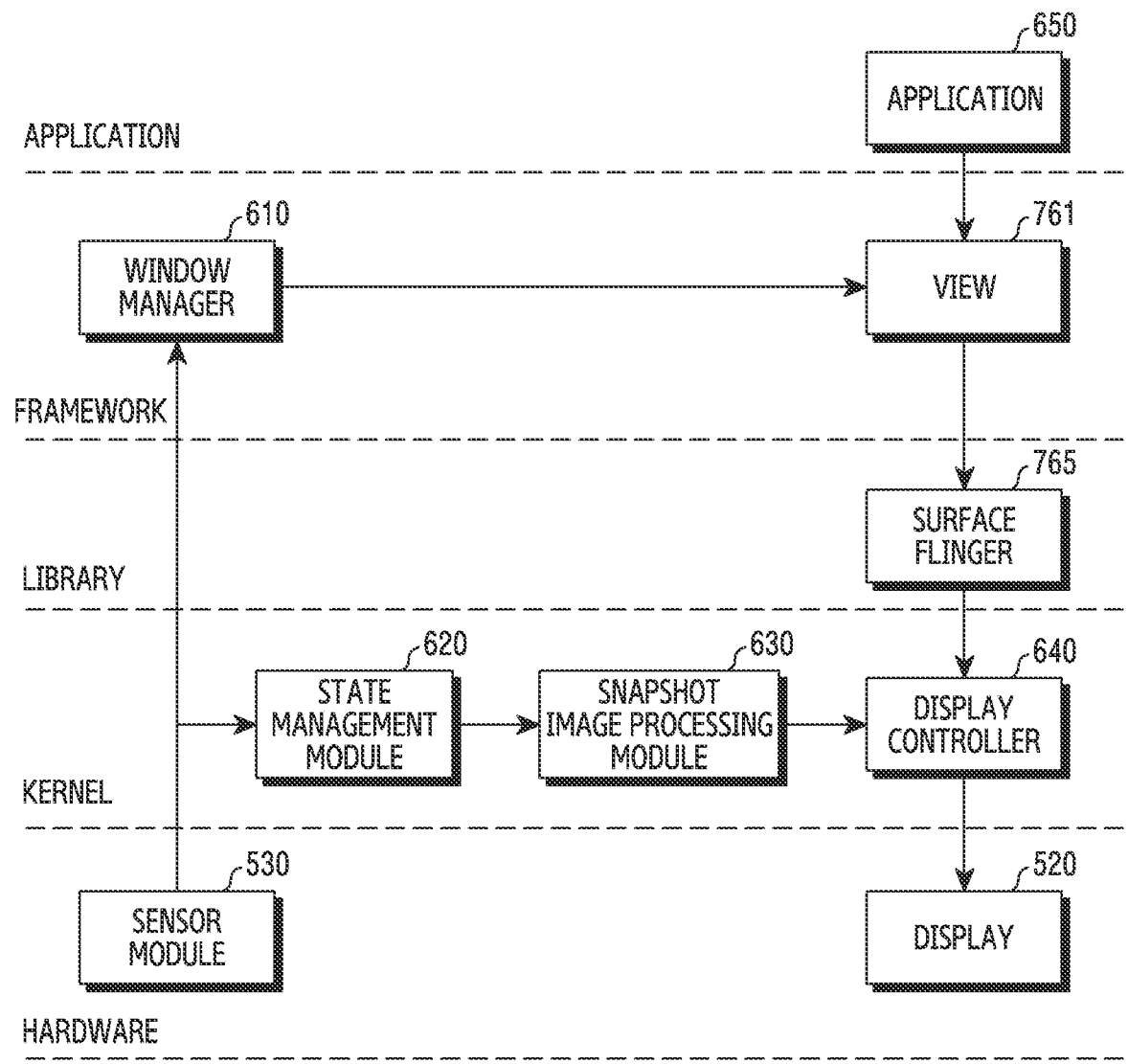
FIG. 7 is a block diagram illustrating a program of an electronic device according to an embodiment of the disclosure.

FIG. 7 is a block diagram illustrating a structure of an electronic device (for example, the electronic device 101 of FIG. 1) according to an embodiment of the disclosure.

Referring to FIG. 7, a structure of the electronic device (for example, the electronic device 101 of FIG. 1) may include a kernel, a library, a framework, and an application layer. Referring to FIG. 7, a hardware layer may include a sensor module 530, a display 520, or a combination of these. Referring to FIG. 7, the kernel layer may include a state management module 620, a snapshot image processing module 630, a display controller 640, or a combination of these. Referring to FIG. 7, the library layer may include a surface flinger 765. Referring to FIG. 7, the framework layer may include a window manager 610, a view 761, or a combination of these. Referring to FIG. 7, the application layer may include an application 650. In an embodiment, some functions of a window compositor 660 may be implemented by the display controller 640. In an embodiment, some functions of the window compositor 660 may be implemented by the surface flinger 765.

In an embodiment, the display 520, the sensor module 530, the window manager 610, the state management module 620, the snapshot image processing module 630, the application 650, and the display controller 640 of FIG. 7 may correspond to the display 520, the sensor module 530, the window manager 610, the state management module 620, the snapshot image processing module 630, the application 650, and the display controller 640 of FIG. 6, respectively.

In an embodiment, the view 761 may be a program for drawing at least one layer based on a resolution of a second display area of the display 520. In an embodiment, the application 650 may draw at least one layer based on the resolution of the second display area of the display 520 by using the view 761.

In an embodiment, the surface flinger 765 may synthesize a plurality of layers. In an embodiment, the surface flinger 765 may provide data indicating the synthesized plurality of layers to the display controller 640.

Figure 8:
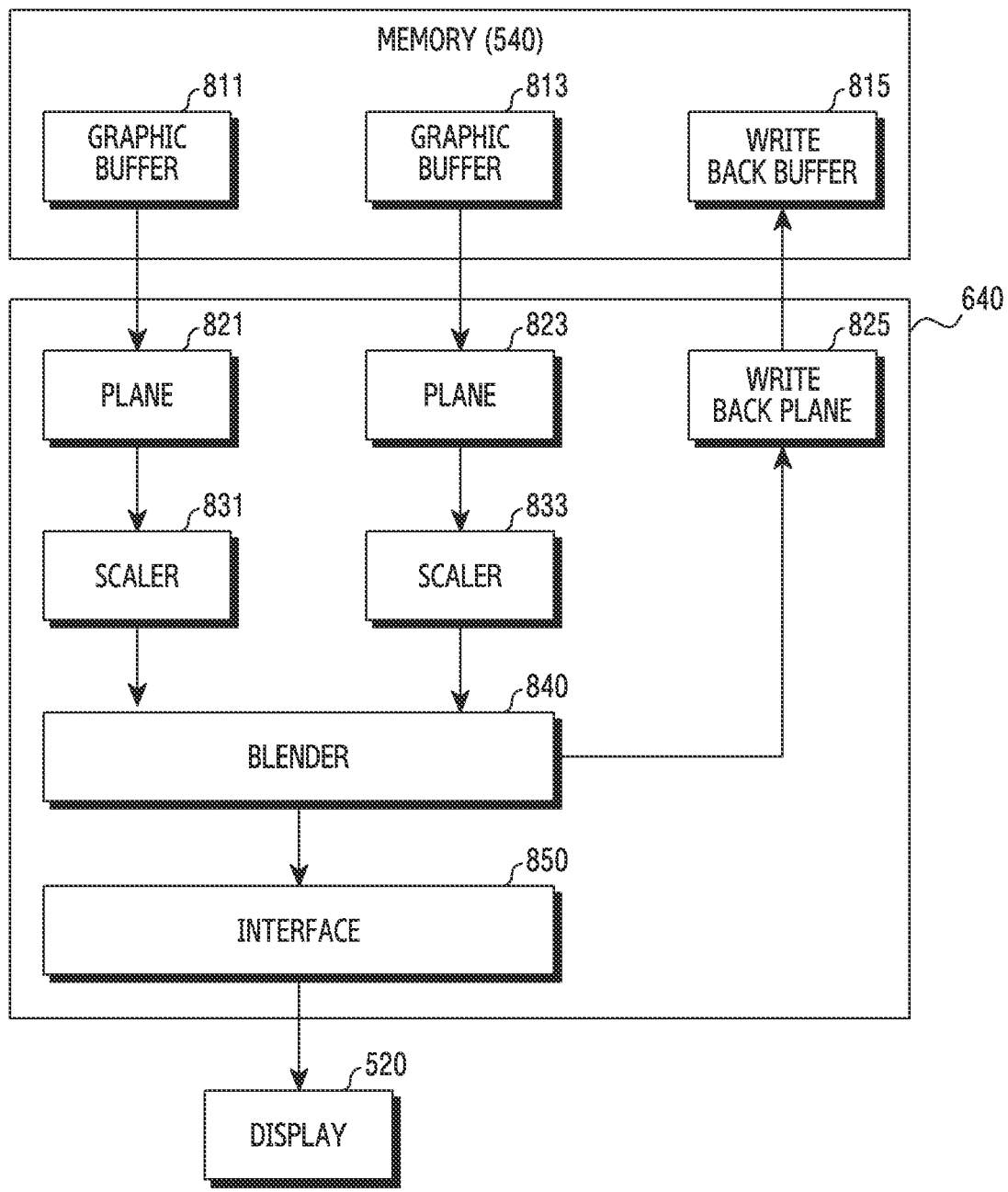
FIG. 8 is a block diagram illustrating a display controller of an electronic device according to an embodiment of the disclosure.

FIG. 8 is a block diagram illustrating a display controller 640 of an electronic device (for example, the electronic device 101 of FIG. 1) according to an embodiment of the disclosure.

Referring to FIG. 8, the display controller 640 of the electronic device (for example, the electronic device 101 of FIG. 1) may include at least one planes 821, 823, at least one scaler 831, 833, a blender 840, an interface 850, a write back plane 825, or a combination of these.

In an embodiment, the at least one plane 821, 823 may read images recorded on graphic buffers 811, 813 corresponding to the at least one plane 821, 823, respectively.

In an embodiment, the at least one scaler 831, 833 may perform graphic-processing (for example, scaling) with respect to image data read by the at least one plane 821, 823.

In an embodiment, the blender 840 may generate a final image by synthesizing the image data graphic-processed by the at least one scaler 831, 833.

In an embodiment, the interface 850 may package the final image according to a protocol of the interface 850, and may transmit the packaged image to a display 520. In an embodiment, the interface may include an MIPI, an HDMI, a DP, or a combination of these.

In an embodiment, the write back plane 825 may hook the final image recorded on the blender 840 and may record the image on a write back buffer 815 of a memory 540.

Figure 9:
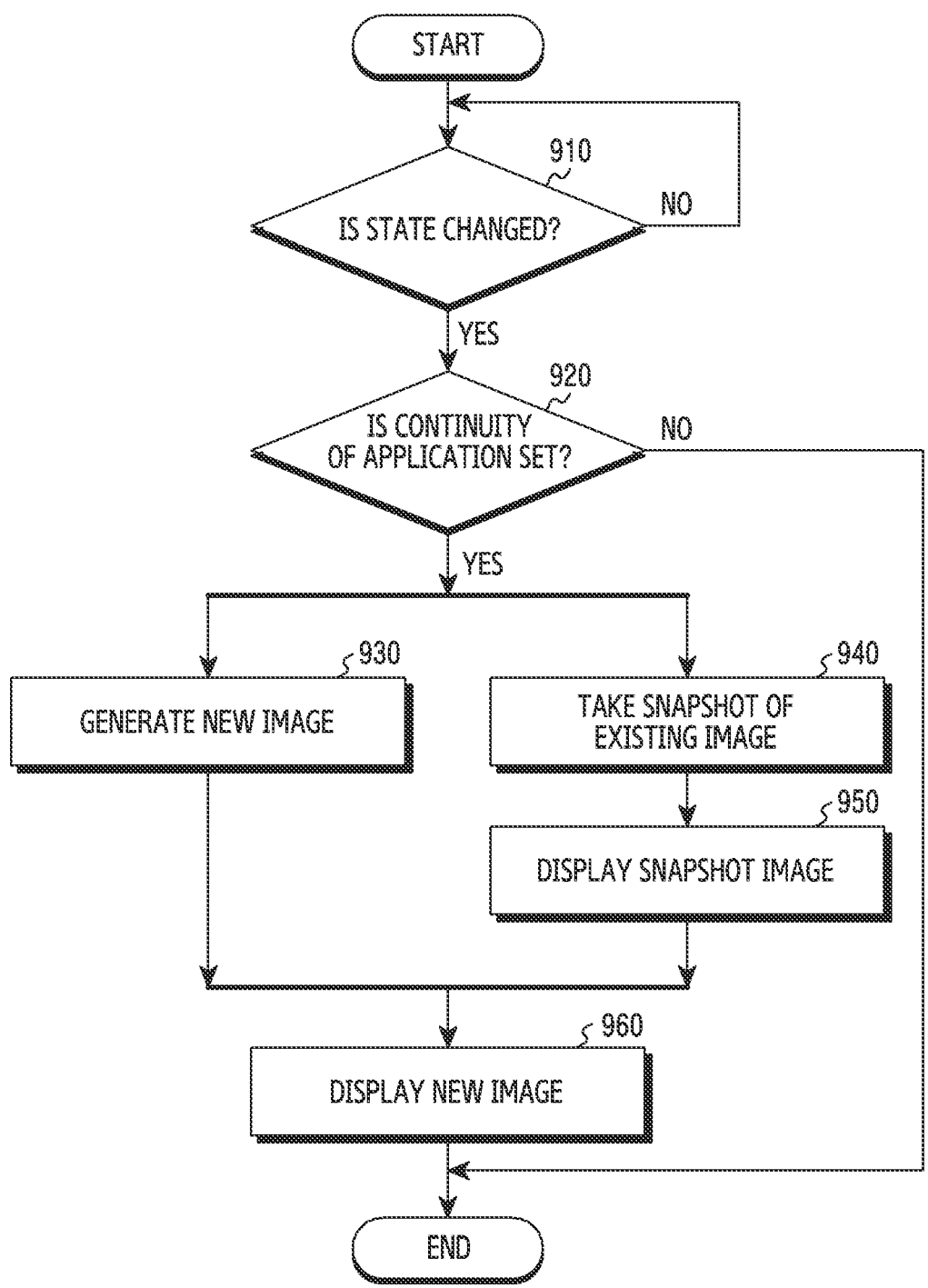
FIG. 9 is a flowchart illustrating an operation of an electronic device according to an embodiment of the disclosure.

FIG. 9 is a flowchart illustrating an operation of an electronic device (for example, the electronic device 101) according to an embodiment of the disclosure.

Referring to FIG. 9, in operation 910, a processor (for example, the processor 510) of the electronic device 101 may identify a state change of the electronic device 101. In an embodiment, the processor 510 may identify the state change of the electronic device 501 based on a sensor module 530. In an embodiment, the processor 510 may identify a first state change from a folded state of the electronic device 501 to an unfolded state, based on the sensor module 530. In an embodiment, the processor 510 may identify a second state change from the unfolded state of the electronic device 501 to the folded state, based on the sensor module 530.

In an embodiment, when the state change of the electronic device 501 is identified, the processor 510 may activate (for example, turn-on) a new display area of the display 520 corresponding to the changed state of the electronic device 501.

Referring to FIG. 9, in operation 920, the processor 510 may identify whether continuity is set for an application. In an embodiment, when the state change of the electronic device 501 is identified, the processor 510 may identify continuity information of an application (for example, the application 146 of FIG. 1) which is being displayed on a first display area of the display 520. In an embodiment, when the first state change is identified, the processor 510 may identify continuity information according to the first state change of the application which is being displayed on the first display area. In an embodiment, when the second state change is identified, the processor 510 may identify continuity information according to the second state change of the application which is being displayed on the first display area.

Referring to FIG. 9, the processor 510 may process an operation according to operation 930 and an operation according to operation 940 in parallel.

Referring to FIG. 9, in operation 930, the processor 510 may generate a new image. In an embodiment, when the continuity of the application which is being displayed on the first display area of the display 520 is set, the processor 510 may newly generate an image indicating a result of executing the running application. In an embodiment, the new image indicating the result of executing the running application (for example, the application 146 of FIG. 1) may correspond to a resolution of a second display area of the display 520. In an embodiment, the processor 510 may newly generate the image by newly drawing a layer on a certain application, a layer on a status bar, a launcher layer, a wallpaper layer, a layer on a notification, or a combination of these.

Referring to FIG. 9, in operation 940, the processor 510 may take a snapshot of the existing image. In an embodiment, when the state change of the electronic device 501 is identified, the processor 510 may take a snapshot of the existing image displayed on the first display area and may store the snapshot image in the memory 540.

Referring to FIG. 9, in operation 950, the processor 510 may display the snapshot image. In an embodiment, the processor 510 may display the snapshot image on the second display area of the display 520 until the new image is generated.

Referring to FIG. 9, in operation 960, the processor 510 may display the new image. In an embodiment, when the new image is generated, the processor 510 may display the new image on the second display area of the display 520 instead of the existing image.

Figure 10:
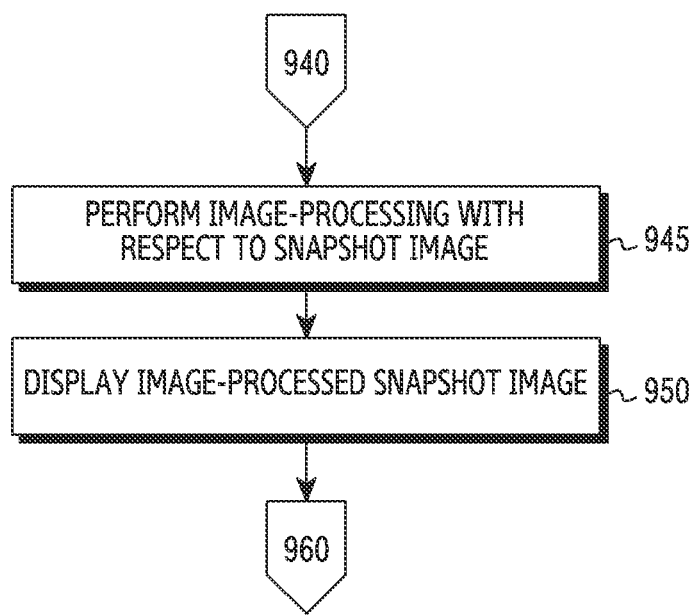
FIG. 10 is a flowchart illustrating an operation of displaying a snapshot image of an electronic device according to an embodiment of the disclosure.

FIG. 10 is a flowchart illustrating an operation of displaying a snapshot image of an electronic device (for example, the electronic device 101 of FIG. 1) according to an embodiment of the disclosure. Operations of FIG. 10 may be included in the operations of FIG. 9.

In an embodiment, operations of FIG. 10 may be performed after operation 940 of FIG. 9. In an embodiment, operations of FIG. 10 may be performed before operation 960 of FIG. 9.

Referring to FIG. 10, in operation 945, the processor (for example, the processor 510) of the electronic device 101 may perform image-processing (for example, scaling, rotation, blurring, or a combination of these) with respect to a snapshot image. In an embodiment, the processor 510 may perform image-processing (for example, scaling, rotation, blurring, or a combination of these) with respect to the snapshot image based on a resolution of the second display area of the display 520.

Referring to FIG. 10, in operation 950, the processor 510 may display the image-processed snapshot image. In an embodiment, the processor 510 may display the image-processed snapshot image on the second display area of the display 520.

Figure 11:
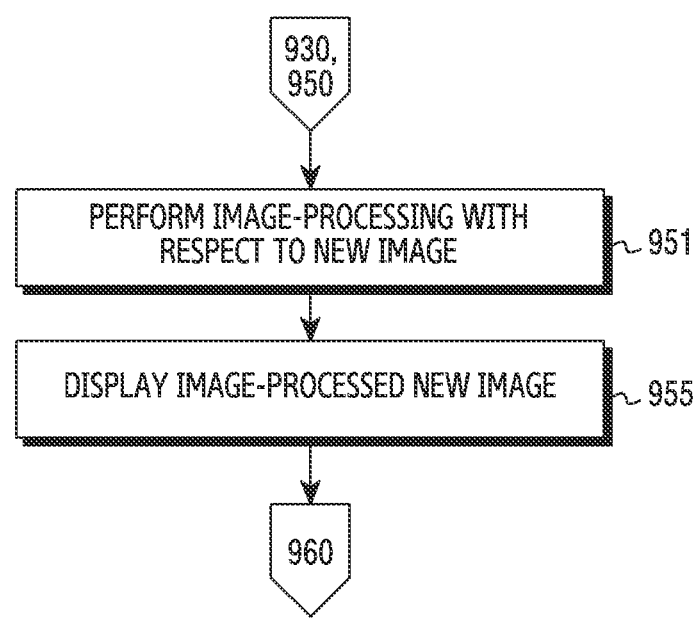
FIG. 11 is a flowchart illustrating an operation of processing a new image of an electronic device according to an embodiment of the disclosure.

FIG. 11 is a flowchart illustrating an operation of processing a new image of an electronic device (for example, the electronic device 101 of FIG. 1) according to an embodiment of the disclosure. Operations of FIG. 11 may be included in the operations of FIG. 9.

In an embodiment, operations of FIG. 11 may be performed after operation 930, and operation 950 of FIG. 9. In an embodiment, operations of FIG. 11 may be performed before operation 960 of FIG. 9.

Referring to FIG. 11, in operation 951, the processor (for example, the processor 510) of the electronic device 101 may perform image-processing (for example, blurring) with respect to a new image.

Referring to FIG. 11, in operation 955, the processor 510 may display the image-processed new image. In an embodiment, the processor 510 may display the image-processed new image on the second display area of the display 520 for a pre-designated time.

Thereafter, in operation 960, the processor 510 may display the new image to which image-processing is not applied on the second display area of the display 520.

As described above, the electronic device 501 and the operating method thereof may take a snapshot of an existing image when a state of the display 520 changes between a folded state and an unfolded state, and may display the snapshot image on a new display area of the display 520, so that user's experience of a delay is reduced.

As described above, according to an embodiment, an electronic device may include a first display disposed on a first surface of the electronic device; a second display disposed on a second surface of the electronic device and having a least a portion thereof being unviewable to a user according to a folding state of the electronic device; a memory configured to store instructions; and a processor electrically connected with the first display, the second display, and the memory. The processor may be configured to execute the instructions to detect a change in the folding state of the electronic device while displaying a first image on one of the first display or the second display; when the change of the folding state is detected, generate a second image to display on the other of the first display or the second display, which did not display the first image; while generating the second image, store a snapshot image of the first image in the memory; display the snapshot image on the other of the first display or the second display; and when the second image is generated, display the second image on the other of the first display or the second display instead of the snapshot image.

In an embodiment, the processor may be further configured to execute the instructions to: when the change of the folding state is detected, identify a setting regarding continuity of a running application; and when the setting regarding the continuity of the running application is identified, generate the second image to display on the other of the first display or the second display.

In an embodiment, the processor may be further configured to execute the instructions to, when the setting regarding the continuity of the running application is not identified, display a pre-designated screen on the other of the first display or the second display.

In an embodiment, the processor may be further configured to execute the instructions to, when the setting regarding the continuity of the running application corresponding to the change of the folding state is identified, generate the second image to display on the other of the first display or the second display.

In an embodiment, the processor may be further configured to execute the instructions to perform image-processing with respect to the snapshot image, and to display the image-processed snapshot image on the other of the first display or the second display.

In an embodiment, the image-processing may be at least one of scaling, rotation, or blurring.

In an embodiment, the processor may be further configured to execute the instructions to perform image-processing with respect to the second image, and to display the image-processed second image on the other of the first display or the second display for a pre-set time.

In an embodiment, the electronic device may further include a display controller to provide data indicating an image to display on the first display, the second display or a display of a combination thereof, and the display controller may further include a write back plane to store the snapshot image on the first image in the memory by hooking the data temporarily stored in the display controller.

In an embodiment, the processor may be further configured to execute the instructions to, when the change of the folding state is detected, turn off the one of the first display or the second display and to turn on the other of the first display or the second display.

In an embodiment, a resolution of the first display and a resolution of the second display may be different from each other.

As described above, according to an embodiment, an electronic device may include a display in which an area facing a user is changed according to a folding state of the electronic device; a memory configured to store instructions; and a processor electrically connected with the display and the memory. The processor may configured to execute the instructions to detect a change of the folding state of the electronic device while displaying a first image on a first area of the display; when the change of the folding state is detected, identify a second area of the display corresponding to the changed folding state; generate a second image to display on the identified second area; while generating the second image, store a snapshot image regarding the first image in the memory and to display the snapshot image on the identified second area of the display; and when the second image is generated, display the second image on the identified second area of the display instead of the snapshot image.

In an embodiment, the processor may be further configured to execute the instructions to, when the change of the folding state is detected, identify a setting regarding continuity of a running application, and when the setting regarding the continuity of the running application is identified, generate the second image to display on the identified second area.

In an embodiment, the processor may be further configured to execute the instructions to, when the setting regarding the continuity of the running application is not identified, display a pre-designated screen on the identified second area.

In an embodiment, the processor may be further configured to execute the instructions to, when the setting regarding the continuity of the running application corresponding to the change of the folding state is identified, generate the second image to display on the identified second area.

In an embodiment, the processor may be further configured to execute the instructions to perform image-processing with respect to the snapshot image, and to display the image-processed snapshot image on the identified second area.

In an embodiment, the image-processing may be at least one of scaling, rotation, or blurring.

In an embodiment, the processor may be further configured to execute the instructions to perform image-processing with respect to the second image, and to display the image-processed second image on the identified second area for a pre-set time.

In an embodiment, the electronic device may further include a display controller configured to provide data indicating an image to display on the display, and the display controller may further include a write back plane configured to store the snapshot image regarding the first image in the memory by hooking the data temporarily stored in the display controller.

In an embodiment, the processor may be further configured to execute the instructions to, when the change of the folding state is detected, turn on the identified second area among the areas of the display.

In an embodiment, a resolution of the first area and a resolution of the second area may be different from each other.

Methods based on the claims or the embodiments disclosed in the disclosure may be implemented in hardware, software, or a combination of both.

When implemented in software, a non-transitory computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including a first housing and a second housing;
   a hinge unit rotatably connecting the first housing and the second housing;
   a first display disposed on a first side of the first housing and a second side of the second housing;
   a second display disposed on a second side of the first housing, located at an opposite side of the first side;
   at least one sensor;
   a processor; and
   memory storing instructions that, when executed by the processor, cause the electronic device to:
      detect, via the at least one sensor, a change in a folding angle of the electronic device while displaying a first image on one of the first display or the second display,
      when the change of the folding angle is detected, display a snapshot image of the first image on the other of the first display or the second display, and generate a second image based on the first image and a resolution corresponding to the other of the first display or the second display, and
      when the generation of the second image is completed, display the second image on the other of the first display or the second display instead of the snapshot image.

2. The electronic device of claim 1, wherein the processor is further configured to execute the instructions to:
   when the change of the folding angle is detected, identify a setting regarding continuity of a running application, and
   when the setting regarding the continuity of the running application is identified, generate the second image to display on the other of the first display or the second display.

3. The electronic device of claim 2, wherein the processor is further configured to execute the instructions to, when the setting regarding the continuity of the running application is not identified, display a pre-designated screen on the other of the first display or the second display.

4. The electronic device of claim 2, wherein the processor is further configured to execute the instructions to, when the setting regarding the continuity of the running application corresponding to the change of the folding angle is identified, generate the second image to display on the other of the first display or the second display.

5. The electronic device of claim 1, wherein the processor is further configured to execute the instructions to:
   perform image processing with respect to the snapshot image, and
   display the image processed snapshot image on the other of the first display or the second display.

6. The electronic device of claim 1, wherein the processor is further configured to:
   execute the instructions to perform image processing with respect to the second image, and
   display the image processed second image on the other of the first display or the second display for a pre-set time.

7. The electronic device of claim 1, further comprising:
   a display controller configured to provide data indicating an image to display on the first display, the second display, or a combination of the first display and the second display,
   wherein the display controller comprises a write back plane configured to store the snapshot image on the first image in the memory by hooking the data temporarily stored in the display controller.

8. The electronic device of claim 1, wherein the processor is further configured to execute the instructions to, when the change of the folding angle is detected, turn off the one of the first display or the second display and to turn on the other of the first display or the second display.

9. The electronic device of claim 1, wherein the snapshot image is displayed until a new image is generated.

10. An electronic device comprising:
a housing including a first housing and a second housing;
a hinge unit rotatably connecting the first housing and the second housing;
a display in which an area facing a user is changed according to a folding angle of the electronic device;
at least one sensor;
a processor; and
memory storing instructions that, when executed by the processor, cause the electronic device to:
detect, via the at least one sensor, a change of the folding angle of the electronic device while displaying a first image on a first area of the display,
when the change of the folding angle is detected, display a snapshot image of the first image on a second area of the display corresponding to the changed folding state, and generate a second image based on the first image and a resolution corresponding to the second area, and
when the generation of the second image is completed, display the second image on the second area of the display instead of the snapshot image.

11. The electronic device of claim 10, wherein the processor is further configured to execute the instructions to:
when the change of the folding angle is detected, identify a setting regarding continuity of a running application, and
when the setting regarding the continuity of the running application is identified, generate the second image to display on the second area.

12. The electronic device of claim 11, wherein the processor is further configured to execute the instructions to, when the setting regarding the continuity of the running application is not identified, display a pre-designated screen on the second area.

13. The electronic device of claim 11, wherein the processor is further configured to execute the instructions to, when the setting regarding the continuity of the running application corresponding to the change of the folding angle is identified, generate the second image to display on the second area.

14. The electronic device of claim 10,
wherein the processor is further configured to:
execute the instructions to perform image processing with respect to the snapshot image, and
display the image processed snapshot image on the second area, and wherein the image processing is at least one of scaling, rotation, or blurring.

15. The electronic device of claim 10, wherein the processor is further configured to execute the instructions to:
perform image processing with respect to the second image, and
display the image processed second image on the second area for a pre-set time.

16. The electronic device of claim 10, further comprising:
a display controller configured to provide data indicating an image to display on the display,
wherein the display controller comprises a write back plane configured to store the snapshot image regarding the first image in the memory by hooking the data temporarily stored in the display controller.

* * * * *